United States Patent [19]
Ezzet

[11] Patent Number: 5,603,051
[45] Date of Patent: Feb. 11, 1997

[54] INPUT/OUTPUT PROCESSOR WITH A LOCAL MEMORY PROVIDING SHARED RESOURCES FOR A PLURALITY OF INPUT/OUTPUT INTERFACES ON AN I/O BUS

[75] Inventor: Ali Ezzet, Sunnyvale, Calif.

[73] Assignee: Hewlett-Packard Company, Palo Alto, Calif.

[21] Appl. No.: 472,795

[22] Filed: Jun. 6, 1995

[51] Int. Cl.$^6$ .................................................. G06F 13/00
[52] U.S. Cl. .......................................... 395/822; 395/474
[58] Field of Search .............................. 395/200.01, 650, 395/823, 308, 822, 474

[56] References Cited

U.S. PATENT DOCUMENTS

| | | | |
|---|---|---|---|
| 4,449,182 | 5/1984 | Rubinson et al. | 364/200 |
| 4,815,034 | 3/1989 | Mackey | 364/900 |
| 5,131,081 | 7/1992 | MacKenna et al. | 395/275 |
| 5,247,671 | 9/1993 | Adkins et al. | 395/650 |
| 5,255,369 | 10/1993 | Dann | 395/200 |
| 5,408,612 | 4/1995 | Shirron et al. | 395/275 |
| 5,444,852 | 8/1995 | Nakabayashi | 395/823 |
| 5,499,346 | 3/1996 | Amini et al. | 395/308 |
| 5,511,165 | 4/1996 | Brady et al. | 395/200.01 |

OTHER PUBLICATIONS

Fong, A. S., A Heterogeneous Multiprocessing Computer System with Shared Memory, IEEE, pp. 225–228 1993.
IEEE Standard for Communicating Among Processors and Peripherals using Shared Memory (DMA), IEEE, abstract Jan. 31, 1994.

*Primary Examiner*—Thomas C. Lee
*Assistant Examiner*—Duo Chen

[57] ABSTRACT

Within a computing system, an input/output processor provides resources shared by several input/output interfaces. The computing system includes both a host bus and an input/output bus. One or more host processors are connected to the host bus. A bus bridge connects the input/output bus to the host bus. The bus bridge is used for transferring information between the host bus and the input/output bus. A first input/output interface provides an interface between a first external input/output system and the input/output bus. A second input/output interface provides an interface between a second external input/output system and the input/output bus. An input/output processor, also connected to the input/output bus, includes an embedded processor connected to a local memory. The input/output processor controls data transactions through the first input/output interface and controls data transactions through the second input/output interface. The local memory provides temporary storage for data transactions through the first input/output interface and for data transactions through the second input/output interface.

17 Claims, 5 Drawing Sheets

INPUT/OUTPUT PROCESSOR WITH A LOCAL MEMORY PROVIDING SHARED RESOURCES FOR A PLURALITY OF INPUT/OUTPUT INTERFACES ON AN I/O BUS

BACKGROUND

The present invention concerns a computing system with an input/output bus (I/O) and more particularly concerns multiple input/output devices sharing processing and memory resources.

In computing systems which function as network servers, it is increasingly common to utilize multiple central processing units (CPUs) interconnected by a host (processor/memory) bus. In such a system a main memory for the system is also connected to the host bus. Communication with I/O devices is generally through an I/O bus connected to the host bus through a bus bridge.

Typically I/O devices are used to connect external input/output systems, for example, networks or mass storage, to the computing system. Each I/O device generally includes a dedicated processor and local memory. The local memory is used to temporarily store data being transferred to or received from the external I/O system. An external I/O system interface generally controls data transfer between the external I/O system and the local memory. The dedicated processor is used to control data transfers between the local memory and the I/O bus.

In order to function properly, the bus bridge needs to implement all the features of both the host bus and the I/O bus. In addition, the bus bridge is required to perform data transfers over the host bus at a sufficient bandwidth to prevent performance degradation.

Some I/O buses require that data transactions be atomic. That is, other transactions need to be "locked out" during atomic data transactions. A bus bridge which interfaces with such an I/O bus needs to be able to implement this feature. However, when an bus bridge performs atomic transactions, this slows down overall system performance.

When there are multiple processors in a system competing with the bus bridge for access to memory over the host bus, this can slow the access of the bus bridge to main memory and thus cause a significant bottleneck in performance in system I/O.

SUMMARY OF THE INVENTION

In accordance with the preferred embodiment of the present invention, a computing system is presented in which an input/output processor provides resources shared by several input/output interfaces. The invention is utilized in a computing system which includes both a host bus and an input/output bus. One or more host processors are connected to the host bus. A bus bridge connects the input/output bus to the host bus. The bus bridge is used for transferring information between the host bus and the input/output bus. A first input/output interface provides an interface between a first external input/output system and the input/output bus. A second input/output interface provides an interface between a second external input/output system and the input/output bus. An input/output processor, also connected to the input/output bus, includes an embedded processor connected to a local memory. The input/output processor controls data transactions through the first input/output interface and controls data transactions through the second input/output interface. The local memory provides temporary storage for data transactions through the first input/output interface and for data transactions through the second input/output interface.

In the preferred embodiment, data transfers involving any input/output interface connected to the input/output bus are set up by control information transferred between the host processor and the embedded processor. During the data transfers, temporary storage for transferred data is provided by the local memory.

In one embodiment of the present invention, the host main memory for the computing system is segmented as follows. A first main memory segment is connected to the host bus. A second main memory segment is part of the local memory within the input/output processor. The first main memory segment and the second main memory segment are configured to appear to the processors as a single logical memory image. What this means is that both the first main memory segment and the second main memory segment are addressed and managed by operating system software as if they are both part of main memory. From the point of view of the operating system software, the only difference between the first main memory segment and the second main memory segment is the range of addresses assigned to each.

The segmented main memory is used to streamline data paths for the computing system. For example, a data transfer between a first input/output interface and a second input/output interface is controlled by the processor; however, during the first data transfer, the data itself is temporarily stored in the second main memory segment. This allows the data transfer to occur with only control information flowing through the bus bridge. The actual data is transported only on the input/output bus between the second main memory segment and the first input/output interface, and between the second main memory segment and the second input/output interface.

The present invention may also be utilized when there are multiple input/output buses. For example, the computing system described above may include a second input/output bus and a second bus bridge connected between the second input/output bus and the host bus. The second bus bridge is used for transferring information between the host bus and the second input/output bus. The input/output processor is connected to the second input/out bus in addition to being connected to the first input/output bus. Thus data transfers involving any input/output interface connected to either the first input/output bus or the second input/output bus are set up by control information transferred between the host processor and the embedded processor. During the data transfers, temporary storage for transferred data is provided by the local memory.

The present invention has several significant advantages. For example, the use of a separate input/output processor allows for a significant simplification in the design of input/output boards to be connected to an input/output bus. Since processing power and local storage is provided by the input/output processor, this functionality no longer needs to be placed on every input/output board. Provided there is sufficient bandwidth available on the input/output bus, and significant processing power and storage space available in the input/output processor this will not degrade system performance.

In addition, if the host main memory is segmented, as described above, this can result in a significant reduction of traffic on the host (processor) bus. This is especially important when the host bus includes bus masters which compete with a main processor for access to the main memory. In a multi-processor environment, the contention is even higher due not only to the incremental traffic from the additional CPUs, but also to cache coherency protocols which tend to force an upper limit on the number of CPUs that can be placed on the host bus without degrading performance.

DESCRIPTION OF THE PRIOR ART

Figure 1:
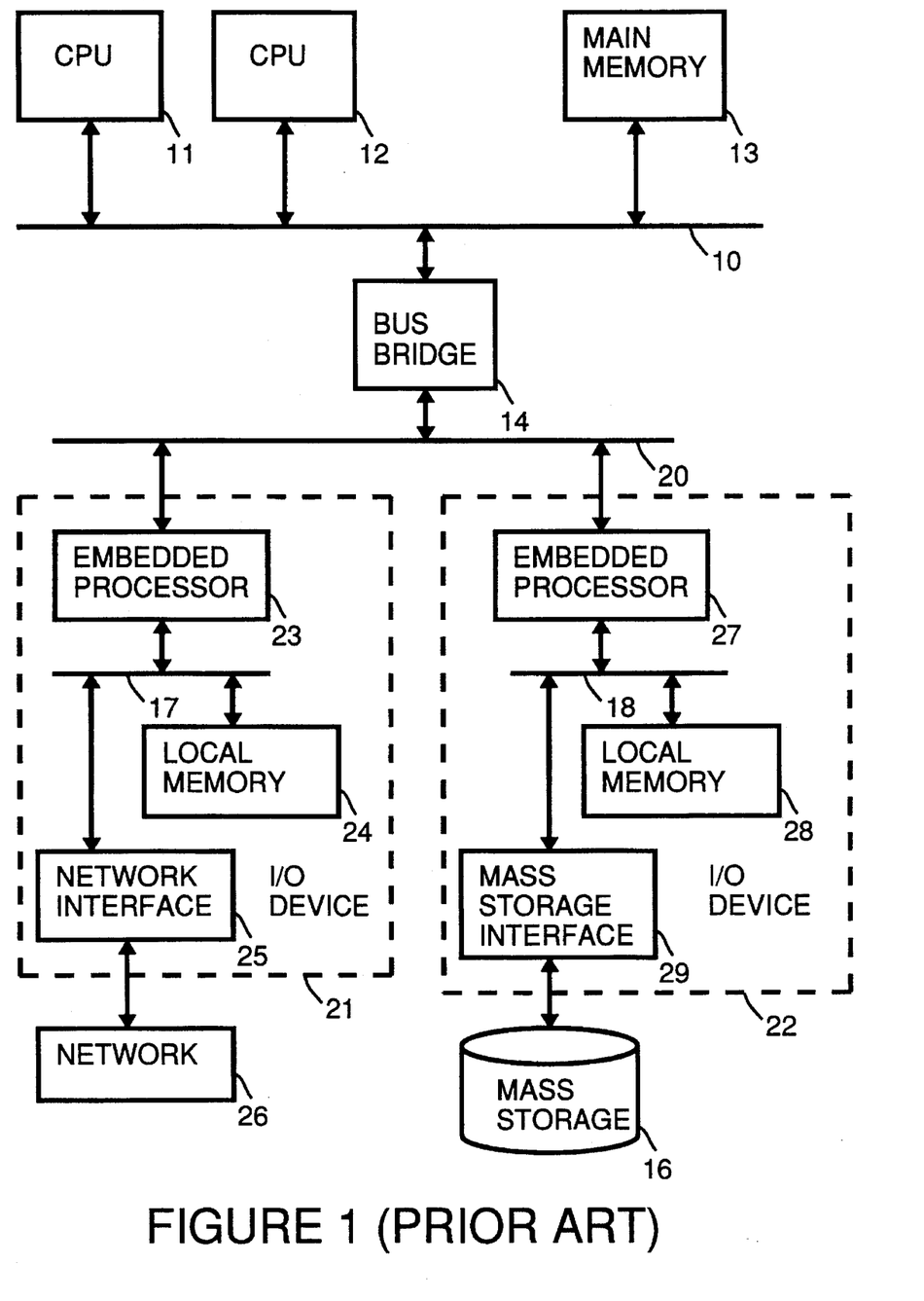
FIG. 1 shows a computing system utilizing an input/ output (I/O) bus connected through a bus bridge to a host bus and connected to various I/O devices in accordance with the prior art.

FIG. 1 shows a computing system utilizing a host bus 10 connected through a bus bridge 14 to an I/O bus 20. On host bus 10 are connected a central processing unit 11, a central processing unit 12 and a main memory 13. Other processors and/or devices may be also connected to host bus 10, dependent upon system configuration. Various I/O devices are connected to I/O bus 20. For example, a network 26 is connected through an I/O device 21 to I/O bus 20. Likewise, system mass storage 16 is connected through and I/O device 22 to I/O bus 20.

I/O device 21 includes a network interface 25, a local memory 24 and an embedded processor 23 connected to an internal bus 17, as shown. I/O device 22 includes a mass storage interface 29, a local memory 28 and an embedded processor 27 connected to an internal bus 18, as shown.

For prior art systems, such as that shown in FIG. 1, which function as a network server, a typical data path when data is received from network 26 is to temporarily stored data in local memory 24, then transport the data through network interface 21 through bus bridge 14 to main memory 13. If the ultimate destination of the data is mass storage 27, the data is then transported from main memory 13 through bus bridge 14 to temporarily store the data in local memory 28. The data is then sent through mass storage interface 29 to mass storage 16. In a typical file/print server environment, it is noted that processors 11 and 12 generally do not need to access the data itself. Processors 11 and 12 merely provide control structure that determines where the data comes from and where it goes.

DESCRIPTION OF THE PREFERRED EMBODIMENT

Figure 2:
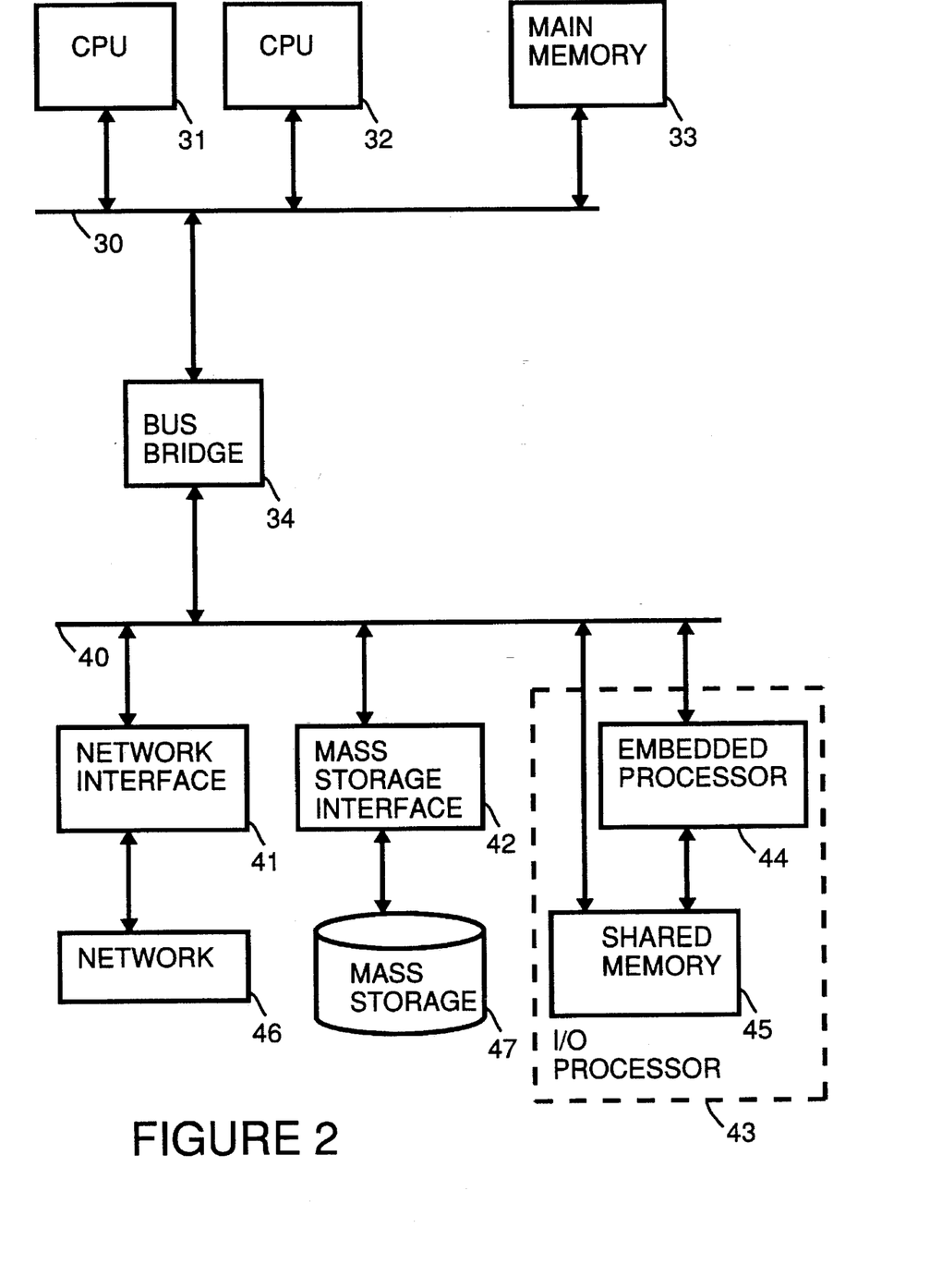
FIG. 2 shows a computing system in which a processor and shared memory are placed on an I/O bus as shared resources, in accordance with the preferred embodiment of the present invention.

FIG. 2 shows a computing system utilizing a host bus 30 connected through a bus bridge 34 to an I/O bus 40, in accordance with a preferred embodiment of the present invention. On host bus 30 are connected a central processing unit 31, a central processing unit 32 and a main memory 33. Other processors may be also connected to host bus 30, dependent upon system configuration. Various I/O devices are connected to I/O bus 40. For example, a network 46 is connected through network interface 41 to bus 40. Likewise, system mass storage 47 is connected through mass storage interface 42 to I/O bus 40. In addition, an I/O processor 43 is connected to I/O bus 40.

Host bus 30 is, for example, sixty-four bits wide and operates in accordance with, for example the XXPRESS bus standard, the P-6 bus standard or some other host bus standard. CPU 31 is, for example, a Pentium processor, a P-6 processor, or some other processor. Information on the Pentium processor, the P-6 processor and their respective host busses are available from Intel Corporation, having a business address of 2200 Mission College Boulevard, Santa Clara, Calif. 95050.

CPU 32 is, for example, a Pentium processor, a P-6 processor, or some other processor. Main memory segment 33 is, for example, implemented using SIMMs and is expandable to 1024 Megabytes.

I/O bus 40, for example, is thirty-two bits wide and operates in accordance with the Peripheral Component Interconnect (PCI) bus standard as described in the PCI 2.1 specification. Network 46, for example, operates in accordance with the Ethernet protocol as described in the IEEE 802.3 standard. Mass storage 47 is, for example, implemented using one or more commercially available hard disk drives. Main memory segment 43 is, for example, implemented using SIMMs and is expandable to 256 Megabytes.

I/O processor 43 includes an embedded processor 44 and a shared memory 45. I/O processor functions as a shared resource for the other entities connected to I/O bus 40. In the computing system shown in FIG. 2, a typical data path when data is received from network 46 is to forward the data through network interface 41 through I/O bus 40 to be temporarily stored in shared memory 45. The data is then transported through bus bridge 34 to main memory 33. If the ultimate destination of the data is mass storage 47, the data is then transported from main memory 33 through bus bridge 34 to temporarily store the data in shared memory 45. The data is then sent through mass storage interface 42 to mass storage 47.

In the preferred embodiment, I/O processor 43 handles low level programming interactions with network interface 41 and mass storage interface 42. For example these low level programming interactions include handling interrupts for data completion, retry, error conditions and etc. The low level programming interactions also include, for example, register level interactions with network interface 41 and mass storage interface 42 such as a read of a register, a write to a register or a check of status bits in a register within network interface 41 or mass storage interface 42.

In a typical file/print server environment, it is noted that processors 31 and 32 generally do not need to access this data itself. Processors 31 and 32 merely provide control structure that determines where the data comes from and where it goes.

Figure 3:
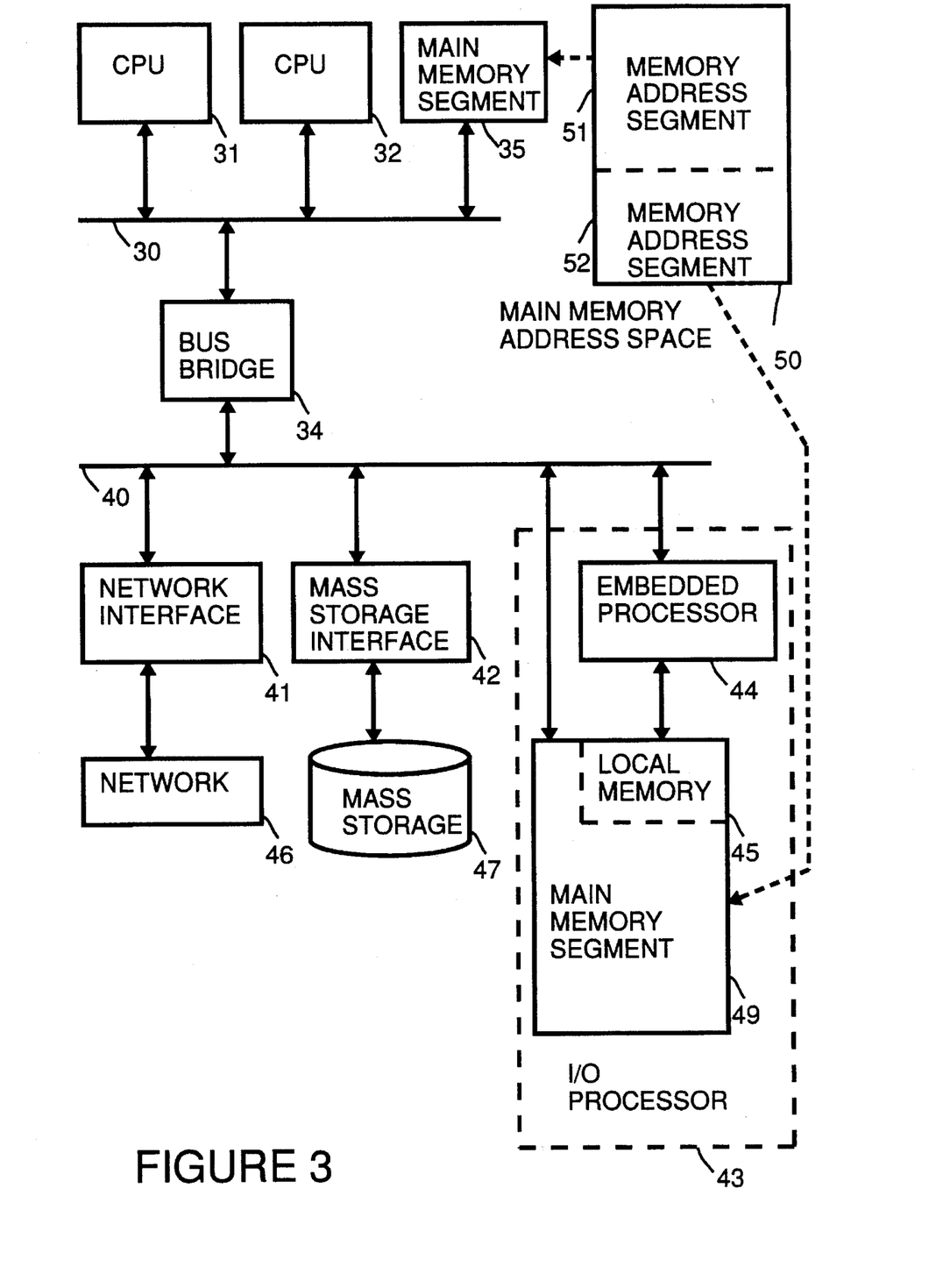
FIG. 3 shows a computing system in which a processor and shared memory are placed on an I/O bus as shared resources, and in which host main memory is segmented in accordance with a preferred embodiment of the present invention.

Therefore, for various applications, it is desirable to modify the computing system shown in FIG. 2 so that data will not have to be forwarded through bus bridge 34. This will result in a significant saving in bandwidth on host bus 30. Such a computing system is shown in FIG. 3. In FIG. 3, main memory 33 is replaced by a memory segment 35 on host bus 30 and a main memory segment 49 on I/O bus 40. For example, the majority of memory within I/O processor 43 is utilized as main memory segment 49. The remaining memory in I/O processor serves a local memory 45 for embedded processor 44.

For example, as shown in FIG. 3, a memory address segment 51 of a main memory address space 50 is allocated to main memory segment 35. A memory address segment 52 of main memory address space 50 is allocated to main memory segment 49. It is not a requirement that memory address segment 51 and memory address segment 52 are contiguous, it is only necessary that both are addressed and managed by operating system software as if they are both part of main memory. For example, main memory address segment 51 is allocated addresses from $0_{16}$ to $2FFFFFFF_{16}$. Main memory address segment 52 is allocated addresses from $40000000_{16}$ to $4FFFFFFF_{16}$.

Both host bus 30 and I/O bus 40 utilize thirty-two bit addresses. The address space is the same for both host bus 30 and I/O bus 40 and there is no address translation that needs to be performed by bus bridge 30.

The computer system shown in FIG. 3 operates in accordance with, for example, Windows NT operating system software available from Microsoft Corporation, having a business address at 16011 NE 36th Way, Redmond, Wash. 98073-9717, or Netware operating system software available from Novell, Inc., having a business address at 122 East 1700 South, Provo, Utah 94601. Other operating systems, such as UNIX operating system software, may also be utilized. Main memory segment 35 and main memory segment 49, although physically separate, are configured as a single logical memory image, which can be done without modifying the operating system software. Thus the main memory address for data will determine whether data is to be located in main memory segment 35 or main memory segment 49.

The physical splitting of the main memory into two segments allows for the reduction of data traffic on host bus 30 without changes to operating system software.

For example, reception of data from network 46 through network interface 41 and placement of the data in mass storage 47 is generally performed in two steps. In the first step, the data is received from network 46 through network interface 41 and placed in the main memory. In the second step, the data is transferred from the main memory through mass storage interface 42 to mass storage 47.

Control information still flows across bus bridge 34 during the set-up for the data transfer. For example, one of CPU 31 or CPU 32 will set up the data transfer. During this data set-up, control information pertaining to the data transfer, will flow across bus bridge 34. However, when setting up the data transfer, the responsible processor will designate addressable memory within main memory segment 49 for temporary storage of data for the data transactions.

When transferred data is received from network 46 through network interface 41, the transferred data is placed in main memory segment 49. The transferred data is then transferred from main memory segment 49 through mass storage interface 42 to mass storage 47. As is clear, the utilization of main memory segment 49 for this data transfer reduced the traffic across bus bridge 34. Only the control information flowed across bus bridge 34. All the data transfer was performed utilizing only I/O bus 40.

While one great advantage of the present invention is that it allows a significant performance improvement without changes to the operating system software, a greater level of performance improvement can be achieved by modifying code within the operating system so that the operating system is aware of the partitioning of main memory and actively helps in streamlining and shortening data paths.

Additionally, while the embodiment of FIG. 3 shows the present invention implemented in a system with a single I/O bus, the principles of the present invention extend to many system configurations.

Figure 4:
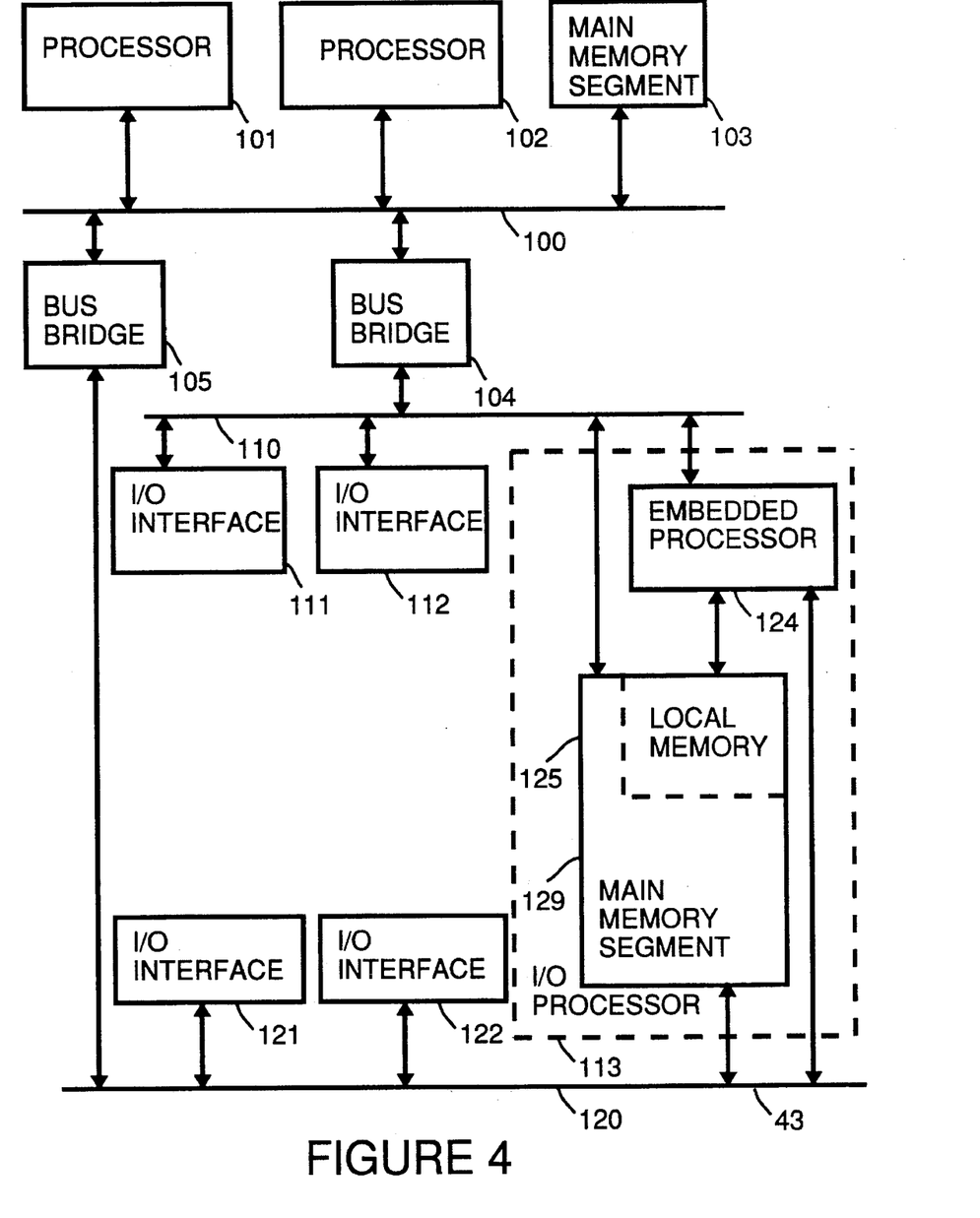
FIG. 4 shows a computing system in which a processor and shared memory are placed between two I/O busses as shared resources, and in which host main memory is segmented in accordance with a preferred embodiment;of the present invention.

For example, FIG. 4 shows a computing system utilizing a host bus 100 connected through a bus bridge 104 to an I/O bus 110 and also connected through a bus bridge 105 to an I/O bus 120 in another alternate preferred embodiment. On host bus 100 are connected a processor 101, a processor 102 and a main memory segment 103. Other processors may be also connected to host bus 100, dependent upon system configuration. Various I/O interfaces are connected to I/O bus 110. For example, an I/O interface 111 and an I/O interface 112 are connected to I/O bus 110. An I/O processor 113 is also connected to I/O bus 110. Likewise, various I/O interfaces are connected to I/O bus 120. For example, an I/O interface 121 and an I/O interface 122 are connected to I/O bus 120. I/O processor 113 is also connected to I/O bus 120.

I/O processor 113 includes an embedded processor 124. I/O processor also includes local memory 125 for embedded processor 125 and a main memory segment 129. Main memory segment 129 may be accessed from both I/O bus 110 and I/O bus 120.

When performing data transfers between I/O interfaces, the flow of control information travels across bus bridge 104 and bus bridge 105 to processor 101 and/or processor 102. When setting up a data transfer between two I/O interfaces, the responsible processor, processor 101 and/or processor 102, arranges for the data to be placed in the memory segment closest to the ultimate destination. The architecture in FIG. 4 can be specifically advantageous for data received from a location on one I/O bus and transferred to a location on another I/O bus. Thus, for a data transfer between I/O interface 122 to I/O interface 112, main memory segment 129 is used so that in is not necessary for data to be transferred over host bus 100. This will reduce cross bus traffic, total latencies on both the host bus and the I/O busses and the potential for stalling I/O interfaces.

Figure 5:
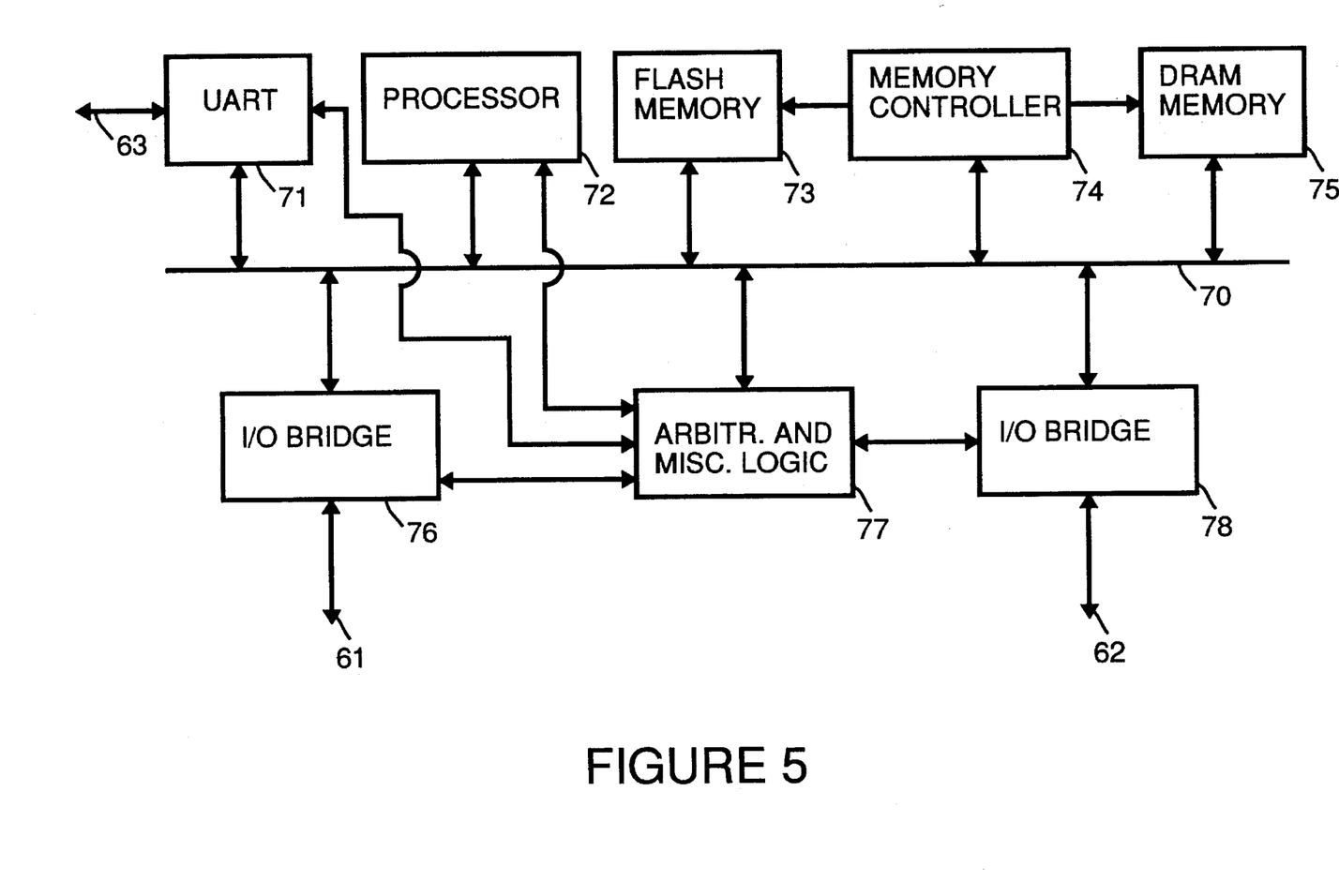
FIG. 5 shows a block diagram of an I/O processor which include resources shared by two I/O busses.

FIG. 5 is a block diagram of an implementation of I/O processor 113. I/O processor 113 includes a local processor 72, a flash memory 73, a memory controller 74 a dynamic random access memory (DRAM) 75, an I/O bridge 76, an I/O bridge 78, a UART 71 and arbitration and miscellaneous logic 77 all connected to a local bus 70, as shown. For example, local processor 72 is an i960 JF processor available from Intel Corporation, having a business address of 2200 Mission College Boulevard, Santa Clara, Calif. 95050. Local bus 70 is 32 bits wide and operates in accordance with i960 bus standard. Flash memory 73 is, for example 256 kilobytes, and is used to store programming code for processor 72. DRAM memory 75 is, for example, 256 megabytes. A portion of DRAM memory 72 is used by processor 72 as a local memory and a portion of DRAM memory 72 is used as a segment of host main memory, as discussed above. A memory controller 74 provides control signals to flash memory 73 and DRAM memory 75. I/O bridge 76 and I/O bridge 78 are implemented using i960/PCI Bridge integrated circuitry available from PLX Technologies, Inc., having a business address of 625 Clyde Avenue, Mountain View, Calif. 94043. Connection from I/O bridge 76 to an I/O bus is represented by lines 61. Connection from I/O bridge 78 to an I/O bus is represented by lines 62. Arbitration and miscellaneous logic arbitrates access to local bus 70. UART 71 provides a serial connection 63 to I/O processor 113 which is used for testing and service of I/O processor 113.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computing system comprising:

a host bus;

a host processor, coupled to the host bus;

an input/output bus;

a bus bridge coupled between the input/output bus and the host bus, the bus bridge being used for transferring information between the host bus and the input/output bus;

a first input/output interface, connected to the input/output bus, which provides an interface between a first external input/output system and the input/output bus;

a second input/output interface, connected to the input/output bus, which provides an interface between a second external input/output system and the input/output bus; and, an input/output processor, connected to the input/output bus, the input/output processor including:

a local bus, an embedded processor connected to the local bus, and a local memory, connected to the local bus, the input/output processor controlling data transactions through the first input/output interface and the input/output processor controlling data transactions through the second input/output interface, the local memory providing temporary storage for data transactions through the first input/output interface and for data transactions through the second input/output interface.

2. A computing system as in claim 1 wherein a first data transfer between the first input/output interface and the second input/output interface is set up by control information transferred between the host processor and the embedded processor.

3. A computing system as in claim 2, wherein during the first data transfer, transferred data is stored in the local memory.

4. A computing system as in claim I additionally comprising:

a main memory for the computing system comprising, a first main memory segment coupled to the host bus, and a second main memory segment, the second main memory segment being part of the local memory, wherein the first main memory segment and the second main memory segment are configured to appear to the host processor as a single logical memory image.

5. A computing system as in claim 4 wherein a first data transfer between the first input/output interface and the second input/output interface is set up by control information transferred between the host processor and the embedded processor.

6. A computing system as in claim 5, wherein during the first data transfer, transferred data is stored in the local memory.

7. A computer system as in claim 1 additionally comprising:

a second input/output bus;

a second bus bridge coupled between the second input/output bus and the host bus, the second bus bridge being used for transferring information between the host bus and the second input/output bus; and a third input/output interface, coupled to the second input/output bus, which provides an interface between a third external input/output system and the second input/output bus;

wherein the input/output processor, is also coupled to the second input/output bus, the input/output processor controlling data transactions through the third input/output interface, the local memory providing temporary storage for data transactions through the third input/output interface.

8. A computing system as in claim 7 wherein a first data transfer between the first input/output interface and the third input/output interface is set up by control information transferred between the host processor and the embedded processor.

9. A computing system as in claim 8, wherein during the first data transfer, transferred data is stored in the local memory.

10. A computing system as in claim 7 additionally comprising:

a main memory for the computing system comprising, a first main memory segment coupled to the host bus, and a second main memory segment, the second main memory segment being part of the local memory, wherein the first main memory segment and the second main memory segment are configured to appear to the host processor as a single logical memory image.

11. A computing system as in claim 1 wherein the input/output bus operates in accordance to a PCI bus standard.

12. In a computing system, a method for controlling data transfers over an input/output bus, comprising the steps of:

(a) setting up all data transfers to be performed over the input/output bus using an input/output processor, the input/output processor having a local bus, an embedded processor connected to the local bus, and a local memory connected to the local bus, step (a) including the following substep:

(a.1) sending control information sent between the input/output processor and a host processor connected to the host bus, the control information passing through a bus bridge connected between the input/output bus and the host bus; and, (b) for each data transfer set up in step (a), transferring data over the input/output bus between one of the plurality of input/output interfaces and the local memory within the input/output processor.

13. A method as in claim 12 additionally comprising the following step performed before step (a):

(c) configuring a first main memory segment connected to the host bus and a second main memory segment within the local memory to appear to an operating system for the computing system as a single logical memory image.

14. A computing system as in claim 12 wherein in step (a) and step (b) the input/output bus operates in accordance to a PCI bus standard.

15. In a computing system, a method for controlling data transfers over a first input/output bus and a second input/output bus, comprising the steps of:

(a) setting up all data transfers to be performed over the first input/output bus using an input/output processor, the input/output processor having a local bus, an embedded processor connected to the local bus, and a local memory connected to the local bus, step (a) including the following substep:

(a.1) sending control information between the input/output processor and a host processor connected to the host bus, the control information passing through a bus bridge connected between the first input/output bus and the host bus;

(b) setting up all data transfers to be performed over the second input/output bus using the input/output processor so that data transfers between one of a second plurality of input/output interfaces, connected to the second input/output bus, and the local memory within the input/output processor is set up by control information sent between the input/output processor and the host processor connected to the host bus;

(c) for each data transfer set up in step (a), transferring data over the first input/output bus between one of the first plurality of input/output interfaces and the local memory within the input/output processor; and, (d) for each data transfer set up in step (b), transferring data over the second input/output bus between one of the second plurality of input/output interfaces and the local memory within the input/output processor.

16. A method as in claim 15 additionally comprising the following step performed before step (a):

(e) configuring a first main memory segment connected to the host bus and a second main memory segment within the local memory to appear to an operating system for the computing system as a single logical memory image.

17. A computing system as in claim 15 wherein in steps (a) through (d) the first input/output bus and the second input/output bus operate in accordance to a PCI bus standard.

* * * * *

UNITED STATES PATENT AND TRADEMARK OFFICE
CERTIFICATE OF CORRECTION

PATENT NO.    : 5,603,051
DATED         : February 11, 1997
INVENTOR(S)   : Ezzet It is certified that error appears in the above-identified patent and that said Letters Patent is hereby corrected as shown below:

Column 7,
Line 49, delete "claim I" and insert therefor -- claim 1 --

Signed and Sealed this

Eleventh Day of February, 2003

JAMES E. ROGAN
*Director of the United States Patent and Trademark Office*